Patented Sept. 9, 1924.

1,507,594

UNITED STATES PATENT OFFICE.

WILLIAM C. GEER, OF AKRON, OHIO, ASSIGNOR TO THE B. F. GOODRICH COMPANY, OF NEW YORK, N. Y., A CORPORATION OF NEW YORK.

METHOD OF PRODUCING HARD RUBBER.

No Drawing.   Application filed December 31, 1923.   Serial No. 683,821.

*To all whom it may concern:*

Be it known that I, WILLIAM C. GEER, a citizen of the United States, residing at Akron, in the county of Summit and State of Ohio, have invented a certain new and useful Method of Producing Hard Rubber, of which the following is a specification.

This invention relates to methods of producing hard rubber and is in part a continuation of my former application, Serial No. 589,703, filed September 21, 1922, and entitled "Method of producing hard rubber".

My general object is to provide an improved method by which hard rubber may be economically and conveniently produced. A more specific object is to provide an improved, economical method of vulcanizing ground, scrap, soft rubber to hard rubber.

Briefly stated, my invention comprises heating vulcanized rubber, such as ground, soft rubber scrap, in the presence of a suspension or a solution, preferably a water solution, of a polysulfide such as the polysulfides of sodium, potassium, calcium, magnesium, ammonium, tetraethyl-ammonium, piperdinium, or the various polysulfides or disulfides such as are formed by combining inorganic bases or basic organic amines with hydrogen sulfide and sulphur or by the reaction of such bases or amines directly with sulphur.

In my preferred procedure I use a mixture of inorganic and organic polysulfides. These polysulfides, as such, may be associated with the mixture of scrap rubber and water, or one or more of them may be formed in the water mixture by associating therewith the proper ingredients, the polysulfides then being formed either before or during the subsequent heating of the mixture.

By way of example, 137 grams of commercial, dry lime-sulphur (mainly calcium polysulfide), 4 grams of butylidene paraamino dimethylaniline and 50 c. c. of ammonium hydroxide are dissolved in 800 c. c. of water and the solution placed in an autoclave or pressure heater with 500 grams of ground tire scrap, the mixture being thoroughly stirred and then held at a temperature of from 130° to 140° C. and a pressure of 60 to 80 lbs. per sq. inch for 16 hours, the heat being applied by conducting steam directly into the chamber of the autoclave containing the mixture. At the end of this time substantially all of the rubber in the ground scrap is vulcanized to hard rubber. The product is dried at 110° C. and is ground by passing it first through a tight rubber mill and then further pulverizing it in a pebble mill, a 60 mesh powder being thus produced. This powder has been used in battery jar stock with satisfactory results, 39% of the powder and 2% of palm oil as a softening agent being used in place of 41% of hard rubber dust called for by the particular recipe in which the substitution was made.

As an example of the action of ammonium polysulfide, without the presence of other polysulfides, 500 grams of tire scrap is held at a temperature of from 120° to 140° C. and under a pressure of 100 pounds to the sq. inch with a quantity of ammonium polysulfide containing 100 grams of active polysulfide sulphur, the polysulfide being dissolved in 1200 c. c. of water, with the result that substantially all of the rubber in the tire scrap is vulcanized to hard rubber.

In both of the above described examples the tire scrap is ground to pass a screen of about ¼ inch mesh. A quicker and more complete penetration of the sulphur throughout the rubber obviously may be effected by using a more finely ground scrap.

As an example of producing a polysulfide in the water mixture, ammonia water and sulphur are mixed with the scrap rubber and the mixture heated, whereupon ammonium polysulfide is formed, and the rubber is vulcanized thereby.

Similar procedure with like results may be followed with mixtures of scrap rubber, sulphur and water solutions of such organic bases as aldehyde ammonia, hexa-methylenetetramine, paraphenylene diamine or para-amidodimethylaniline, which have the property of liberating ammonia or ammonia and hydrogen sulfide when heated with sulphur, whereby ammonium polysulfide is formed.

For example, 500 grams of tire scrap are mixed with 1200 c. c. of water, 108 grams of sulphur and 10 grams of para-aminodimethylaniline. The autoclave reaction is continued for 16 hours at 130–140° C. under a maximum pressure of 100 lbs. per sq. inch. The product after drying, grinding and sifting, is a hard, ebonite dust suitable for adding to ebonite mixes in the usual manner and proportions.

There are many other organic bases which form polysulfides on heating with sulphur or on mixing with hydrogen sulfide and sulphur, and which by the proper adjustment of time and temperature, will give an ebonite dust of sufficient hardness to be used as an ingredient in ebonite mixes. Among such bases there may be mentioned piperidine, ethylinediamine, diethylamine, butylamine and amylamine.

I have found that by operating at higher temperatures the time of heating may be shortened or the amount of polysulfide may be reduced, provided sufficient sulphur is present to cause complete vulcanization, the sulfides apparently acting as catalysts.

Advantages of my method over the practice of plasticizing vulcanized rubber, mixing it with sulphur and further vulcanizing it, are that my method requires less manipulation of the stock and produces a better quality of hard rubber, since the scrap rubber need not be plasticized. A further advantage is that by my method the scrap may be vulcanized economically in large quantities in existing types of pressure heaters.

One specific advantage over the method, heretofore known, of heating the rubber in molten sulphur, is that in the latter method excess sulphur adheres to the rubber particles after vulcanization, presenting difficulties and involving expense in the matter of its removal, whereas in my method the hard rubber particles may be removed from the solution after vulcanization in a substantially clean condition and such substances as adhere to them may be readily removed by washing, filtering or centrifuging, or by a combination of these expedients.

The use of an excess of the polysulfide solution is not objectionable, since the rubber will take up only so much sulphur as is required to vulcanize it to hard rubber. By the addition of the necessary quantities of ingredients to bring it up to proper strength, the solution may be repeatedly used.

The method is susceptible of various modifications within the scope of my invention, and I do not wholly limit my claims to the exact procedure described.

I claim:

1. The method of producing hard rubber which comprises heating comminuted soft vulcanized rubber in the presence of a sulphur-giving substance in a liquid carrier.

2. The method of producing hard rubber which comprises heating comminuted soft vulcanized rubber in the presence of a sulphur-giving substance in an aqueous carrier.

3. The method of producing hard rubber which comprises heating comminuted soft vulcanized rubber in the presence of a polysulfide in a liquid carrier.

4. The method of producing hard rubber which comprises heating comminuted soft vulcanized rubber in the presence of a polysulfide in an aqueous carrier.

5. The method of producing hard rubber which comprises heating comminuted soft vulcanized rubber in the presence of an organic polysulfide in a liquid carrier.

6. The method of producing hard rubber which comprises heating comminuted soft vulcanized rubber in the presence of an organic polysulfide in an aqueous carrier.

7. The method of producing hard rubber which comprises heating comminuted soft vulcanized rubber in the presence of a mixture of an inorganic polysulfide and an organic polysulfide in a liquid carrier.

8. The method of producing hard rubber which comprises heating comminuted soft vulcanized rubber in the presence of a mixture of an inorganic polysulfide and an organic polysulfide in an aqueous carrier.

9. The method of producing hard rubber which comprises heating comminuted soft vulcanized rubber in the presence of a nitrogenous polysulfide in an aqueous carrier.

10. The method of producing hard rubber which comprises heating comminuted soft vulcanized rubber in the presence of ammonium polysulfide in an aqueous carrier.

11. The method of producing hard rubber which comprises heating comminuted soft vulcanized rubber in the presence of an inorganic polysulfide in an aqueous carrier.

12. The method of producing hard rubber which comprises heating comminuted soft vulcanized rubber in the presence of calcium polysulfide in an aqueous carrier.

13. The method of producing hard rubber which comprises heating comminuted soft vulcanized rubber in the presence of a sulphur-giving substance and a nitrogenous accelerator in a liquid carrier.

14. The method of producing hard rubber which comprises heating comminuted soft vulcanized rubber in the presence of a sulphur-giving substance and a nitrogenous accelerator in an aqueous carrier.

15. The method of producing hard rubber which comprises heating comminuted soft vulcanized rubber in the presence of a polysulfide and a nitrogenous accelerator in a liquid carrier.

16. The method of producing hard rubber which comprises heating comminuted soft vulcanized rubber in the presence of a polysulfide and a nitrogenous accelerator in an aqueous carrier.

17. The method of producing hard rubber which comprises heating comminuted soft vulcanized rubber in the presence of an organic polysulfide and a nitrogenous accelerator in a liquid carrier.

18. The method of producing hard rubber which comprises heating comminuted soft vulcanized rubber in the presence of an organic polysulfide and a nitrogenous accelerator in an aqueous carrier.

19. The method of producing hard rubber which comprises heating comminuted soft vulcanized rubber in the presence of a mixture of an inorganic polysulfide, an organic polysulfide and a nitrogenous accelerator in a liquid carrier.

20. The method of producing hard rubber which comprises heating comminuted soft vulcanized rubber in the presence of a mixture of an inorganic polysulfide, an organic polysulfide and a nitrogenous accelerator in an aqueous carrier.

21. The method of producing hard rubber which comprises heating comminuted soft vulcanized rubber in the presence of a mixture of a nitrogenous polysulfide and a nitrogenous accelerator in an aqueous carrier.

22. The method of producing hard rubber which comprises heating comminuted soft vulcanized rubber in the presence of a mixture of ammonium polysulfide and a nitrogenous accelerator in an aqueous carrier.

23. The method of producing hard rubber which comprises heating comminuted soft vulcanized rubber in the presence of a mixture of an inorganic polysulfide and a nitrogenous accelerator in an aqueous carrier.

24. The method of producing hard rubber which comprises heating comminuted soft vulcanized rubber in the presence of a mixture of calcium polysulfide and a nitrogenous accelerator in an aqueous carrier.

25. The method of producing hard rubber which comprises heating comminuted soft vulcanized rubber in the presence of a mixture of an inorganic polysulfide and butylidene para-aminodimethylaniline in an aqueous carrier.

26. The method of producing hard rubber which comprises heating comminuted soft vulcanized rubber in the presence of a mixture of calcium polysulfide and butylidene para-aminodimethylaniline in an aqueous carrier.

27. The method of producing hard rubber which comprises heating comminuted soft vulcanized rubber in the presence of a mixture of lime, sulphur and butylidene para-aminodimethylaniline in an aqueous carrier.

In witness whereof I have hereunto set my hand this 24th day of December, 1923.

WILLIAM C. GEER.